March 10, 1959  N. A. PALMGREN  2,876,529
ROLLER CAGES FOR ROLLER BEARINGS
Original Filed Aug. 23, 1955  2 Sheets-Sheet 1
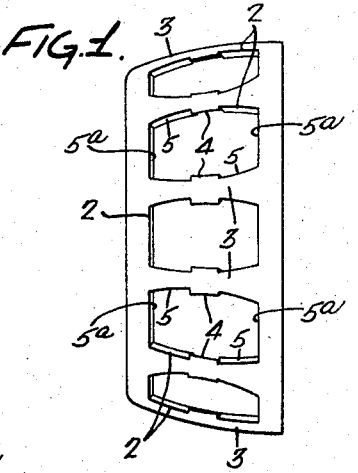
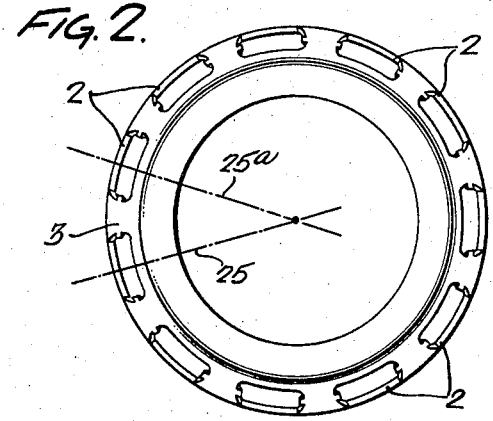
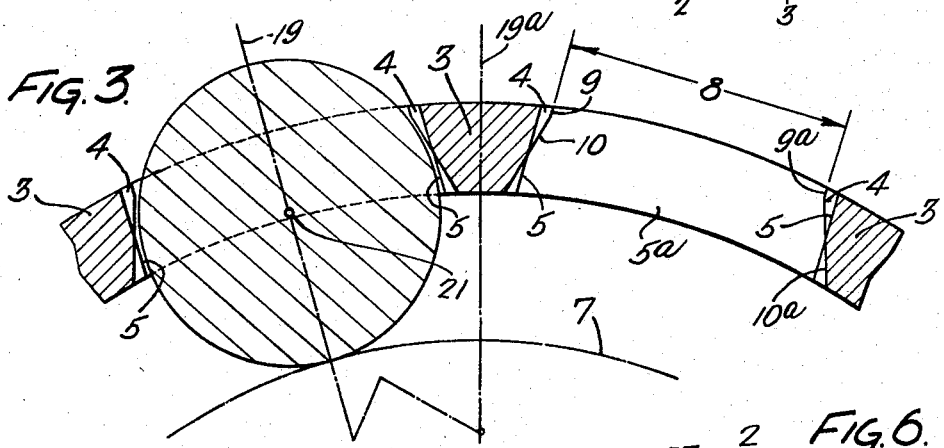
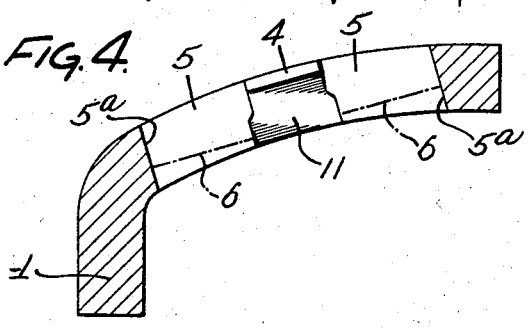
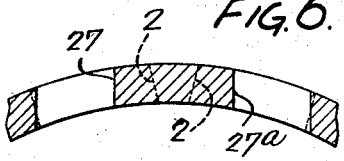
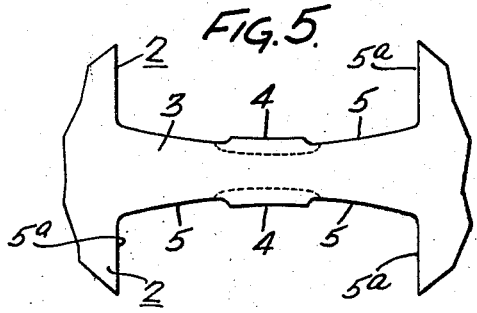
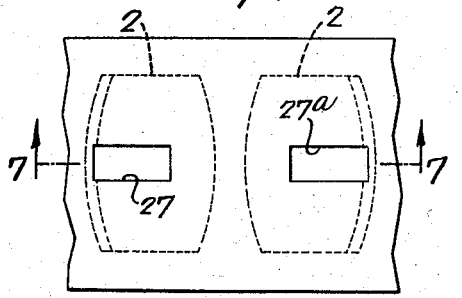
Inventor:
Nils Arvid Palmgren
by Howson & Howson attys.

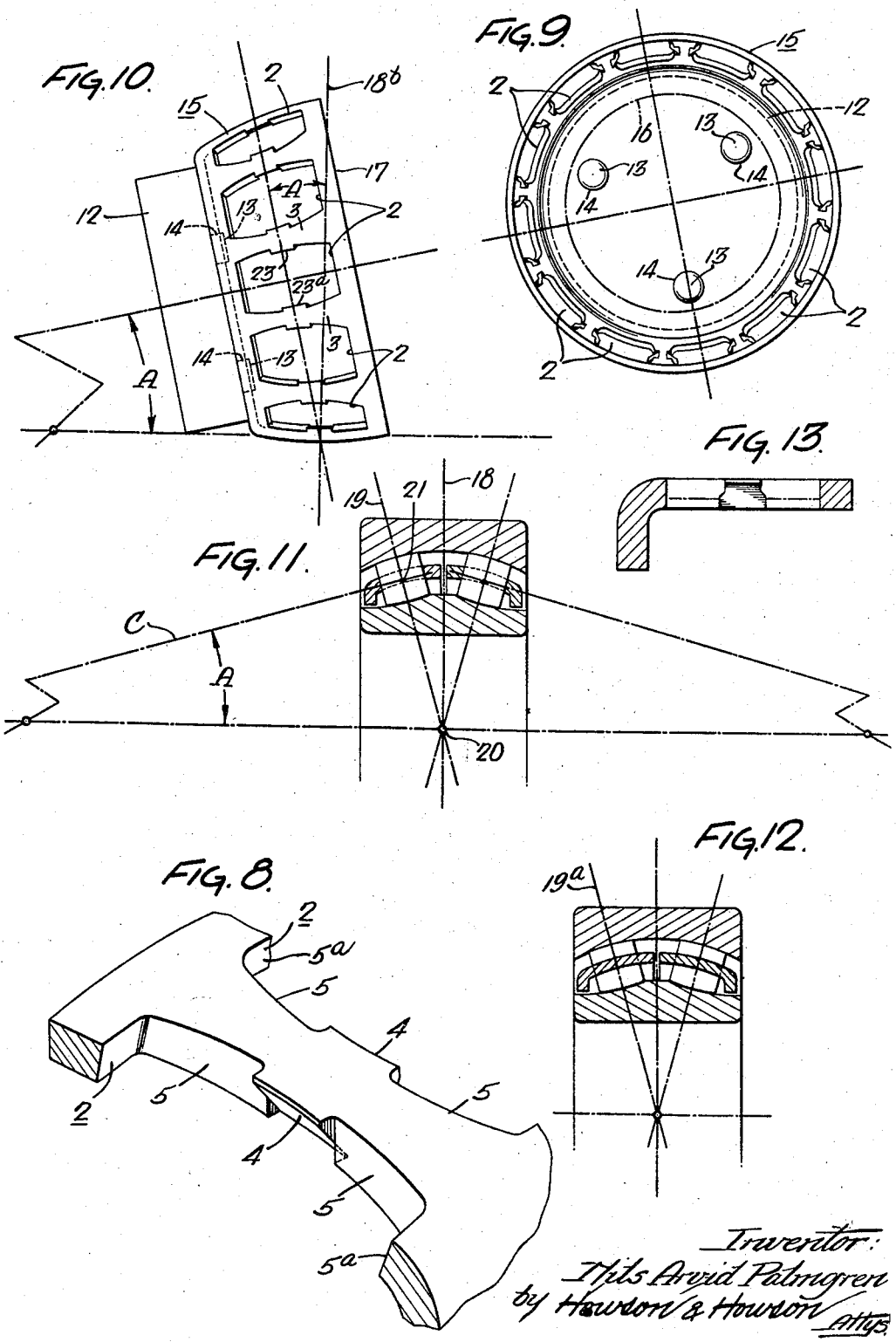

United States Patent Office 2,876,529
Patented Mar. 10, 1959

2,876,529

ROLLER CAGES FOR ROLLER BEARINGS

Nils Arvid Palmgren, Goteborg, Sweden, assignor to SKF Industries, Inc., Philadelphia, Pa., a corporation of Delaware Division of application Serial No. 530,139, August 23, 1955, now Patent No. 2,805,108, dated September 3, 1957. Continuation of abandoned application Serial No. 141,875, February 2, 1950. This application August 22, 1956, Serial No. 609,339

1 Claim. (Cl. 29—148.4)

This invention relates to roller bearing cages of the one piece type, that have window-like openings or pockets for the rollers separated by cross bars that permit radial insertion of rollers and provide for their retention by means of protrusions into the pocket spaces.

The primary object of the invention is to provide a simple and economically practical method of producing cages of the aforesaid type.

A more specific object is to provide a method for production of cages of the stated type wherein the roller pockets and roller retaining elements may be formed by punching operation.

For several years roller bearing manufacturers have used cages made in one piece because: they possess greater strength than those assembled from two or more parts fastened together; they eliminate assembly operations; and, especially in the case of pressed metal cages, to which this invention most nearly applies, they provide for precise manufacture in large quantities at consequent low cost. The one-piece cage also simplifies assembly because the assembler may without complication insert the rollers radially and successively into the several pockets.

In order to keep the assembly of rollers, cage, and one race ring intact for handling, prior designers have arranged to manipulate metal at some parts of the cross bars, as by prick punching the metal near the edge thereof or by the bending of tangs toward the rollers, so as to obstruct the pocket space after the rollers have been inserted. Such manipulation requires time as well as skill in exercising proper control.

The invention contemplates production from a pressed metal cup or blank, and solely by punching operation, of a cage having a series of window-like pockets and pocket-separating cross bars with protrusions which offer slight interference to radial entrance or exit of the rollers. Precise control of the distance between protrusions in relation to roller diameter, combined with choice of material possessing sufficient springing qualities, permits radial passing of the rollers between the protrusions, from whence they will not repass by their own weight but only by force applied to the rollers. The cross bars yield elastically and suffer no plastic deformation in this process, when correctly proportioned.

The drawings illustrate application of the cage of this invention to the well-known double row spherical roller bearing, and in the drawings:

Figs. 1 and 2 show side and end views respectively of a finished cage;

Fig. 3 shows a fragmentary cross section cut by a plane approximately perpendicular to the axis of the cage and bisecting the pockets;

Fig. 4 is a fragmentary cross sectional view through one pocket on a median radial plane containing the axis of the cage;

Fig. 5 is a fragmentary plan view showing one of the cross bars;

Fig. 6 is a sectional view on the line 6—6, Fig. 7;

Fig. 7 is a fragmentary plan view of the cage in an intermediate stage of formation;

Fig. 8 is an enlarged fragmentary view in perspective showing one of the cross bars;

Fig. 9 shows a pressed metal cup-shaped blank with which the process of manufacturing the cage begins;

Fig. 10 shows the cupped blank mounted on a face plate in position for punching that portion of a pocket which conforms with the longitudinal profile of a roller;

Fig. 11 shows in cross section one-half of a spherical roller bearing with rollers in central operating position wherein the axes of the rollers of each row intersect the bearing axis at a common point, said bearing including cages in accordance with this invention;

Fig. 12 is a sectional view similar to Fig. 11 but taken through a cross bar of the cage, and Fig. 13 is a fragmentary sectional view corresponding to that of Fig. 4 but of a cage suitable for cylindrical rollers.

This invention provides a one-piece cage for spacing the rollers of roller bearings, illustrated herein primarily for spherical roller bearings but applicable as well to cylindrical roller bearings. For spherical roller bearings it has a cup-like form with a series of equally spaced window-like pockets which conform with the lengthwise profile of the rollers, except for short distances in the central regions where protrusions project a little into the pocket spaces to obstruct slightly entrance or exit of rollers during assembly or disassembly.

The cage comprises a ring portion 1, a series of pockets 2, and cross bars 3 between pockets having protrusions 4 and flat surfaces 5 which form the side walls of the pockets.

These side walls clear the roller a few thousandths of an inch to allow free rolling and can contact the roller from end to end only at one side thereof at a time, as along dotted line 6 of Fig. 4. Fig. 3 shows a roller in its central operating position in the left-hand pocket, resting against the inner raceway indicated by arc 7. Obviously protrusions 4 will prevent the roller from moving radially outwardly without application of force. The invention provides for movement outwardly for disassembly and for movement inwardly for assembly, by choosing for the cage a material having spring-like qualities and by carefully controlling the distance 8 between two parallel flat surfaces 9, 9a at the outer extremities of the confronting protrusions 4 adjacent to the outer periphery of the cage. Such cage material may consist for example of heat treated steel, non-ferrous metal or plastic. The invention also provides a cross bar of such width with respect to the roller diameter, that it will spring circumferentially of the cage purely by reason of its elasticity to allow passage of each roller in and out of its pocket so that no permanent (that is plastic) deformation at the surfaces will take place. Such organization permits innumerable repetition of roller passage without injury to the cage.

Obviously if the surfaces 9, 9a should continue inwardly parallel with the side walls 5, they would interfere with the rollers assuming their normal positions in the pockets. The invention, therefore, provides for cutting off the said protrusions on an angle which will clear the rollers. Lines 10, 10a in Fig. 3 are the traces of the surfaces, and the numeral 11 in Fig. 4 indicates a face thereof.

The invention also comprises the method of manufacturing this cage in quantity within precisely controlled dimensions. The novelty of method resides in the formation of the previously described essential surfaces of the roller retaining protrusions by punching operations.

The process begins with the pressed metal cup of Figs. 9 and 10 which I mount as shown schematically on a face plate 12 by means of three pins 13, 13, 13 passing through three holes 14, 14, 14 in the bottom of cup 15. I later punch out and discard this bottom portion at circle 16. The face 17 of the plate must tilt from the vertical by the angle A of Fig. 10 which corresponds with the angle A of Fig. 11 between the center plane of symmetry 18 of the bearing for which the cage is designed, and the line 19 connecting the bearing center 20 with the center 21 of any of the rollers when the latter is in the central operation position in its pocket as shown in Fig. 3. Line 19 lies perpendicular to the axis of the roller at its center when the roller is in the aforesaid central operating position, in which positions the axes of all of the rollers in each row intersect at a common point of the bearing axis.

The punch of which two sets are used in the process, act vertically downwardly along the center line 18b, Fig. 10. In the case of the punch cutting the walls 5, the line 18b corresponds with the line 19 which connects the bearing center 20 with the geometric center 21 of a roller, and in the case of the punch cutting the surfaces 10 and 10a, the line 18b corresponds to line 19a, see Fig. 12, which connects the bearing center with the geometric center of one of the cross bars 3.

The first-named punch has the outline of the pocket 2 shown most clearly at the center of Fig. 1. This punch cuts out a slightly larger hole than that which would represent the profile of the roller except in the central regions of cross bars, where it leaves metal for the other punch to cut away to provide the previously explained angular reliefs 10 and 10a. In passing through the cup material, the first-named or outlining punch will produce the flat walls 5 between which the roller may move radially without touching but with which the roller may make contact at one side or the other for guidance. In the event that the second-named punch performs its operation in advance of the first-named punch, as illustrated in Figs. 6 and 7, the first-named punch may at the same time it forms the walls 5 and end walls 5a of the pocket, cut the two narrow parallel flat surfaces 9 and 9a on each side of the pocket.

After the outlining punch withdraws from the punched pocket, the face plate by means of familiar devices, will rotate the cup blank a circumferential distance equal to that between pocket centers, as indicated at 25, 25a in Fig. 2 so that said punch may cut out the next and, successively, subsequent pockets. This punch leaves material at the central regions of the cross bars and within the pocket space as shown in the pocket 2 of Fig. 10 at 23, 23a. This material will have been either previously shaped by the relief punch to the undercut form of the protrusions 4, 4 or must subsequently be so shaped by said punch to permit the roller to assume its operating position in the pocket.

The second-named or relief punch having its cutting edges in the form of the two rectangles 27, 27a of Fig. 7, acting vertically on a center line corresponding to 19a as previously described, and wide enough to reach from the left side of one pocket to the right side and relatively remote side of an adjoining pocket, see Fig. 7, will cut parallel faces 10 and 10a simultaneously, said punch having a recess affording clearance for the cross bar between these pockets. By successively indexing the face plate 12 and the cage blank through angle equal to that contained between the geometric centers of two adjoining cross bars, the undercut faces of all of the protrusions 4 may be cut by the punch, two at a time.

Obviously the two punches must act independently along line 19 of Fig. 11 or the line 19a of Fig. 3, respectively. As indicated above the order in which the punches are made to operate on the blank is a matter of choice.

It will be noted that the punches move as though from the bearing center 20, radially outwardly along line 19 of Fig. 11, or 19a of Fig. 3 as each pocket or cross bar comes into position. The face plate indexes the blank from pocket center to pocket center for the outlining punch, and from cross bar center to cross bar center for the relief punch.

The cage of this invention will suit cylindrical rollers as well as those with curved profile as just described, see Fig. 13. In this case the outlines of the pockets become rectangles, angle A becomes zero, and the axis c of the rollers parallel to the bearing axis.

This application is a division of my co-pending application Serial Number 430,139, filed August 23, 1955, as a continuation of application Serial Number 141,875, now abandoned, of the same inventor filed February 2, 1950, application Serial Number 530,139 having now matured into Patent Number 2,805,108 dated September 3, 1957.

I claim:

The method of manufacturing annular cages for roller bearings having a circumferential series of radially opening window-like pockets for the rollers separated by cross bars together with roller-retaining protrusions projecting into the pockets from the central portions of said bars, said protrusions having pocket-confronting faces inclined to and diverging outwardly of the cage from the faces of the cross bars from which they respectively project, said method consisting of a first series of punching operations progressing around the cage annulus, each said operation forming two separate and relatively remote apertures respectively shaping the inclined faces of two of said protrusions lying respectively at the relatively remote sides of two of said pockets, and said operations collectively forming in successive pairs the inclined faces of all of said protrusions, and a second series of punching operations progressing around the cage annulus, and each forming the two end portions of an individual pocket including the pocket confronting side faces of the proximate cross bars at the opposite sides of the said protrusions.

References Cited in the file of this patent

UNITED STATES PATENTS

| | | |
|---|---|---|
| 1,712,076 | Hughes | May 7, 1929 |
| 2,327,237 | Baden | Aug. 17, 1943 |
| 2,756,518 | Lovell | Oct. 9, 1956 |

UNITED STATES PATENT OFFICE
CERTIFICATE OF CORRECTION

Patent No. 2,876,529                                      March 10, 1959

Nils Arvid Palmgren

It is hereby certified that error appears in the printed specification of the above numbered patent requiring correction and that the said Letters Patent should read as corrected below.

Column 3, line 9, for "operation" read -- operating --; column 4, line 25, for "Serial Number 430,139" read -- Serial Number 530,139 --.

Signed and sealed this 14th day of July 1959.

(SEAL)

Attest:
KARL H. AXLINE
Attesting Officer

ROBERT C. WATSON
Commissioner of Patents